US010612513B2

(12) United States Patent
Bucher et al.

(10) Patent No.: US 10,612,513 B2
(45) Date of Patent: Apr. 7, 2020

(54) AXIAL PISTON MACHINE

(71) Applicant: Mahle International GmbH, Stuttgart (DE)

(72) Inventors: Michael Bucher, Berlin (DE); Christoph Fiala, Potsdam (DE); Mirko Guenther, Berlin (DE); Michael Hoetger, Berlin (DE); Hannes Marlock, Leonberg (DE); Falk Schneider, Korntal-Muechingen (DE)

(73) Assignee: Mahle International GmbH (DE)

( * ) Notice: Subject to any disclaimer, the term of this patent is extended or adjusted under 35 U.S.C. 154(b) by 228 days.

(21) Appl. No.: 15/557,116

(22) PCT Filed: Mar. 2, 2016

(86) PCT No.: PCT/EP2016/054377
§ 371 (c)(1),
(2) Date: Sep. 10, 2017

(87) PCT Pub. No.: WO2016/142229
PCT Pub. Date: Sep. 15, 2016

(65) Prior Publication Data
US 2018/0045171 A1 Feb. 15, 2018

(30) Foreign Application Priority Data

Mar. 11, 2015 (DE) .................. 10 2015 204 374

(51) Int. Cl.
*F03C 1/06* (2006.01)
*F04B 1/14* (2020.01)
(Continued)

(52) U.S. Cl.
CPC ............ *F03C 1/061* (2013.01); *F01B 3/0002* (2013.01); *F01B 3/007* (2013.01); *F02B 75/26* (2013.01);
(Continued)

(58) Field of Classification Search
CPC .. F01B 3/007; F04B 1/14; F04B 1/146; F04B 27/1018
See application file for complete search history.

(56) References Cited

U.S. PATENT DOCUMENTS 4,363,294 A * 12/1982 Searle .................. F01B 15/00
123/193.6
4,491,057 A 1/1985 Ziegler
(Continued)

FOREIGN PATENT DOCUMENTS

DE      4333144 A1    4/1994
DE      4301134 A1    7/1994
(Continued)

OTHER PUBLICATIONS

English abstract for DE-102011118622.
English abstract for DE-102013213614.

*Primary Examiner* — Patrick Hamo
(74) *Attorney, Agent, or Firm* — Fishman Stewart PLLC

(57) ABSTRACT

An axial piston machine may include a rotor having a shaft rotatably mounted in a housing. A plurality of cylinders may be arranged annularly around the rotor. A plurality of pistons may each be disposed within each of the plurality of cylinders and may be constructed and arranged to selectively translate within each of the plurality of cylinders. Each of the plurality of cylinders may be disposed within a cylinder head and may be in operative communication with an inlet opening defined in the cylinder head and at least one outlet opening defined in the housing. An auxiliary outlet rotary slide valve may be operatively connected to the shaft in a rotationally fixed manner. The auxiliary outlet rotary slide valve may comprises an auxiliary outlet rotary opening constructed and arranged to connect to a vent duct of one of the plurality of cylinders based on an angle of rotation, and may vent the one of the plurality of cylinders. At least a portion of the auxiliary outlet rotary slide valve may comprise a material constructed and arranged to reduce a sliding friction resistance, and wherein the material comprises one of a carbon containing material or a polymer containing material.

20 Claims, 3 Drawing Sheets

(51) Int. Cl.
  *F01B 3/00*   (2006.01)
  *F03C 1/36*   (2006.01)
  *F02B 75/26*  (2006.01)
  *F16K 24/04*  (2006.01)
  *F16K 27/04*  (2006.01)

(52) U.S. Cl.
  CPC .............. *F03C 1/0618* (2013.01); *F04B 1/14* (2013.01); *F16K 24/04* (2013.01); *F16K 27/041* (2013.01)

(56) References Cited

U.S. PATENT DOCUMENTS

| | | | | |
|---|---|---|---|---|
| 5,370,506 A | * | 12/1994 | Fujii | F04B 39/08 137/246.23 |
| 5,385,450 A | | 1/1995 | Kimura et al. | |
| 5,540,139 A | | 7/1996 | Martensen et al. | |
| 5,697,336 A | * | 12/1997 | Eisenbacher | F01L 13/06 123/321 |
| 7,458,785 B2 | * | 12/2008 | Murakami | F04B 27/1018 417/269 |
| 8,485,794 B2 | * | 7/2013 | Lee | F04B 27/1072 417/269 |
| 8,899,943 B2 | * | 12/2014 | Kobayashi | F04B 27/0878 417/269 |
| 2005/0169772 A1 | * | 8/2005 | Saitou | F01B 3/007 417/269 |
| 2013/0056992 A1 | * | 3/2013 | Wada | F01K 23/065 290/1 A |
| 2018/0045171 A1 | * | 2/2018 | Bucher | F01B 3/007 |

FOREIGN PATENT DOCUMENTS

| | | |
|---|---|---|
| DE | 102011118622 A1 | 5/2013 |
| DE | 102013213614 A1 | 1/2015 |
| EP | 1544409 A1 | 6/2005 |

* cited by examiner

AXIAL PISTON MACHINE

CROSS-REFERENCE TO RELATED APPLICATIONS

This application claims priority to International Patent Application No.: PCT/EP2016/054377 filed on Mar. 2, 2016, and German Patent Application No.: DE 10 2015 204 374.6, filed on Mar. 11, 2015, the contents of which are incorporated herein by reference in their entirety.

TECHNICAL FIELD

The present invention relates to an axial piston machine with a rotor that is rotatably mounted in a housing having a shaft. The invention additionally relates to a heat recovery system in a motor vehicle having such an axial piston machine.

BACKGROUND

From DE 10 2011 118 622 A1 a generic axial piston machine with a rotor that is rotatably mounted in a housing with a shaft is known, wherein cylinders which are arranged annularly about and parallel to the rotor are provided, in which pistons are arranged so as to be translationally adjustable by means of a working medium, for example steam. Here, each cylinder is assigned an inlet opening in a cylinder head and an outlet opening in the housing. In order to be able to increase the efficiency of the axial piston machine, a so-called auxiliary outlet rotary slide valve is provided, which when the piston is run up from the bottom dead centre position to the top dead centre position makes possible a venting of the cylinder and because of this prevents a compressing of the working medium that is still present in the cylinder because of the inlet opening that is closed at that point in time, accompanied by the concomitant counter-work. To this end, the auxiliary outlet rotary slide valve has a drain opening arranged on the circumference, wherein the auxiliary outlet rotary slide valve is obviously orientated in the axial piston in such a manner that the drain opening of the auxiliary outlet rotary slide valve always assumes congruence with a corresponding drain opening of an associated cylinder, when this cylinder is to be vented.

Usually, such an auxiliary outlet rotary slide valve is solidly embodied from steel, as a result of which the same is not only comparatively heavy but additionally also expensive. In addition the problems result that the auxiliary outlet rotary slide valve frequently rubs against the housing or even seizes up because of tolerance problems, which in the most unfavourable case can lead to the axial piston machine being damaged.

SUMMARY

The present invention therefore deals with the problem of stating an improved or at least an alternative embodiment for an axial piston machine of the generic type, which in particular with respect to its weight is lighter and can additionally be produced more cost-effectively.

According to the invention, this problem is solved through the subject of the independent claim(s). Advantageous embodiments are subject of the dependent claim(s).

The present invention is based on the general idea of embodying an auxiliary outlet rotary slide valve already known from generic axial piston machines no longer as comparatively heavy and expensive steel part but to form the same at least partly from carbon or from a polymer and because of this not only significantly lighter and more cost-effective, but also with a sliding resistance that is substantially reduced compared with an auxiliary outlet rotary slide valve made of steel, which contributes to increasing the efficiency of the axial piston machine according to the invention. The axial piston machine according to the invention has a rotor that is rotatably mounted in a housing with a shaft, wherein annularly about and angularly to the rotor or to the shaft, cylinders are arranged, in which pistons are arranged so as to be translationally adjustable. Here, the cylinders are arranged in a range of +/−30° to the rotor, in particular 0°, i.e. parallel to the rotor. These pistons are driven by a working medium, for example by means of steam heated by exhaust gas. Each of these cylinders in this case is assigned an inlet opening in a cylinder head and at least one associated outlet opening in the housing, wherein the working medium can flow via the inlet opening into the cylinder and out of the same via the outlet opening. In order to increase the efficiency of the axial piston machine, the auxiliary outlet rotary slide valve that is connected to the shaft is additionally provided with an auxiliary outlet opening, wherein the auxiliary outlet opening, also called drain opening in brief, can be connected or is connected to one of the cylinders for venting the same as a function of the angle of rotation. Thus, when the expanding working medium, for example an expanding steam is to be again expelled from the cylinder, the auxiliary outlet rotary slide valve with its auxiliary outlet opening ensures a comparatively low-resistance expulsion of the working medium without much work having to be expended for this purpose. According to the invention, this auxiliary outlet rotary slide valve now comprises a material that reduces the sliding friction resistance, which is formed at least partly from carbon or from a polymer. The auxiliary outlet rotary slide valve can thus be formed entirely from a carbon or polymer-containing material, or have a carbon-containing or polymer-containing coating. The auxiliary outlet rotary slide valve according to the invention is temperature resistant and also fine-wear capable through the choice of material and can, because of this, "grind itself in" into a uniform operating state. By replacing the previous steel component with an auxiliary outlet rotary slide valve which is at least partly formed from a carbon-containing or a polymer-containing material, the auxiliary outlet rotary slide valve according to the invention can also be formed significantly lighter which in particular when using the axial piston machine according to the invention in a motor vehicle is of particular significance. Here, the use of a metallic material is also conceivable in particular with a comparatively high carbon content, which is likewise temperature resistant and has self-lubricating properties. Such an auxiliary outlet rotary slide valve could be produced for example cost-effectively and with high dimensional precision by primary forming, i.e. pressing into a blank and annealing and is nevertheless significantly lighter than a comparable auxiliary outlet rotary slide valve made of steel. In an advantageous further embodiment of the solution according to the invention, the auxiliary outlet rotary slide valve has a pot-shaped basic body deep-drawn from sheet metal, which has a carbon-containing or a polymer-containing coating. In this case, it is not the entire auxiliary outlet rotary slide valve that is formed from the carbon-containing or polymer-containing material which reduces the sliding resistance but the same merely has such a coating, but which however likewise has the properties in the previous paragraph and because of this makes possible both a "grinding in" and also a significantly reduced weight.

Practically, the basic body has a formed collar via which it is connected to the shaft in a rotationally fixed manner, for example welded, soldered, pressed or glued. Particularly a pressing or a soldering in this case represents a possibility on the one hand that is cost-effective and easy to produce and on the other hand is simple for connecting the basic body to the shaft in a rotationally fixed manner. In order to be able to additionally fix this basic body with respect to the shaft, a lid can also be provided which closes off the pot-shaped basic body on the end facing away from the collar, wherein the lid itself likewise has a passage opening and in the region of the same is connected, for example welded, soldered, pressed or glued to the shaft. Obviously it is also conceivable here that the lid has a corresponding collar via which the connection of the shaft is effected.

In an advantageous further development of the solution according to the invention, at least one housing wall that is in contact with the auxiliary outlet rotary slide valve is provided with a polymer-containing coating which reduces the sliding friction resistance. Because of this, a seizing of the auxiliary outlet rotary slide valve can be reliably prevented in particular, wherein at the same time because of the reduced sliding friction resistance an increased ease of movement of the axial piston machine can be achieved.

In an advantageous further development of the solution according to the invention, the polymer-containing coating or the polymer-containing material, of which the auxiliary outlet rotary slide valve at least partly consists, has a matrix of a plastic from polymeric polyimide/amide material, which distributed over the entire matrix has the following composition: 10-25% by volume of aluminium powder, preferably 12.5% by volume of aluminium powder, 2-8% by volume of fluoropolymer, preferably up to 6-8% by volume of fluoropolymer, 2-10% by volume of silane, preferably 3-8% by volume of silane, particularly preferably up to 3-6% by volume of silane and the remaining parts of polyimide/amide resin without random contaminations. Through the addition of silanes, in particular the stability of the polyimide/amide matrix can be improved without the fillers that were required for this in the past. The silane material may be selected from a group consisting of gamma aminopropyl-triethoxysilane and bis-(gamma triemethoxy-silylpropyl) amine Through the polyimide/amide resin matrix, a high chemical resistance and a high mechanical and thermal load capacity can also be achieved. The addition of approximately 2-8% by volume of fluoropolymer, preferably up to 6-8% by volume of fluoropolymer, causes the desired reduction of the friction coefficient wherein as fluoropolymer for example polytetrafluoroethylene (PTFE) can be used. Obviously, further fluoropolymers such as for example fluorinated ethylene propylene (FEP) can also be employed. By means of these fluoropolymers, the sliding properties in particular can be significantly improved.

In an advantageous further development of the solution according to the invention, the aluminium powder has particles in the form of thin flakes with a size of approximately 1 to 40 µm, preferentially 1 to 5 µm. Through such a size distribution of the aluminium particles, the wear resistance can be significantly increased.

In a further advantageous further development of the solution according to the invention, the polymer-containing coating has color pigments, in particular 5-20% by volume of copper phthalocyanine, which colors the polymer coating blue. Thus, any abrasion in the case of wear can be quickly and safely detected.

Practically, the polymer-containing coating is sprayed on. Applying the coating by means of a spraying method does not only constitute a possibility that is simple and highly efficient in terms of production but also cost-effective.

In an advantageous further development of the solution according to the invention, a weight is arranged in the auxiliary outlet rotary slide valve which through its centrifugal force during the operation of the axial piston machine counteracts a pressure force in a cylinder that is situated in the working cycle. Such a weight can for example be enclosed in the carbon-containing or polymer-containing material or attached to the basic body, wherein through the centrifugal force that occurs during the operation the weight at least partly compensates a pressure force acting between cylinder wall and auxiliary outlet rotary slide valve and causing a deformation of the shaft or of the auxiliary outlet rotary slide valve. As mentioned, such a weight can either be attached to the auxiliary outlet rotary slide valve or at least partly embedded in the material of the same. The weight, which is arranged in the auxiliary outlet rotary slide valve, can be formed as additional component or as a material agglomeration of the auxiliary outlet rotary slide valve.

The auxiliary outlet rotary slide valve can be fixed on the shaft by means of a feather key so that driving the auxiliary outlet rotary slide valve by the shaft is ensured.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference characters relate to same or similar or functionally same components.

BRIEF DESCRIPTION OF THE DRAWINGS

In a schematic representation, not to scale.

DETAILED DESCRIPTION

Figure 1:
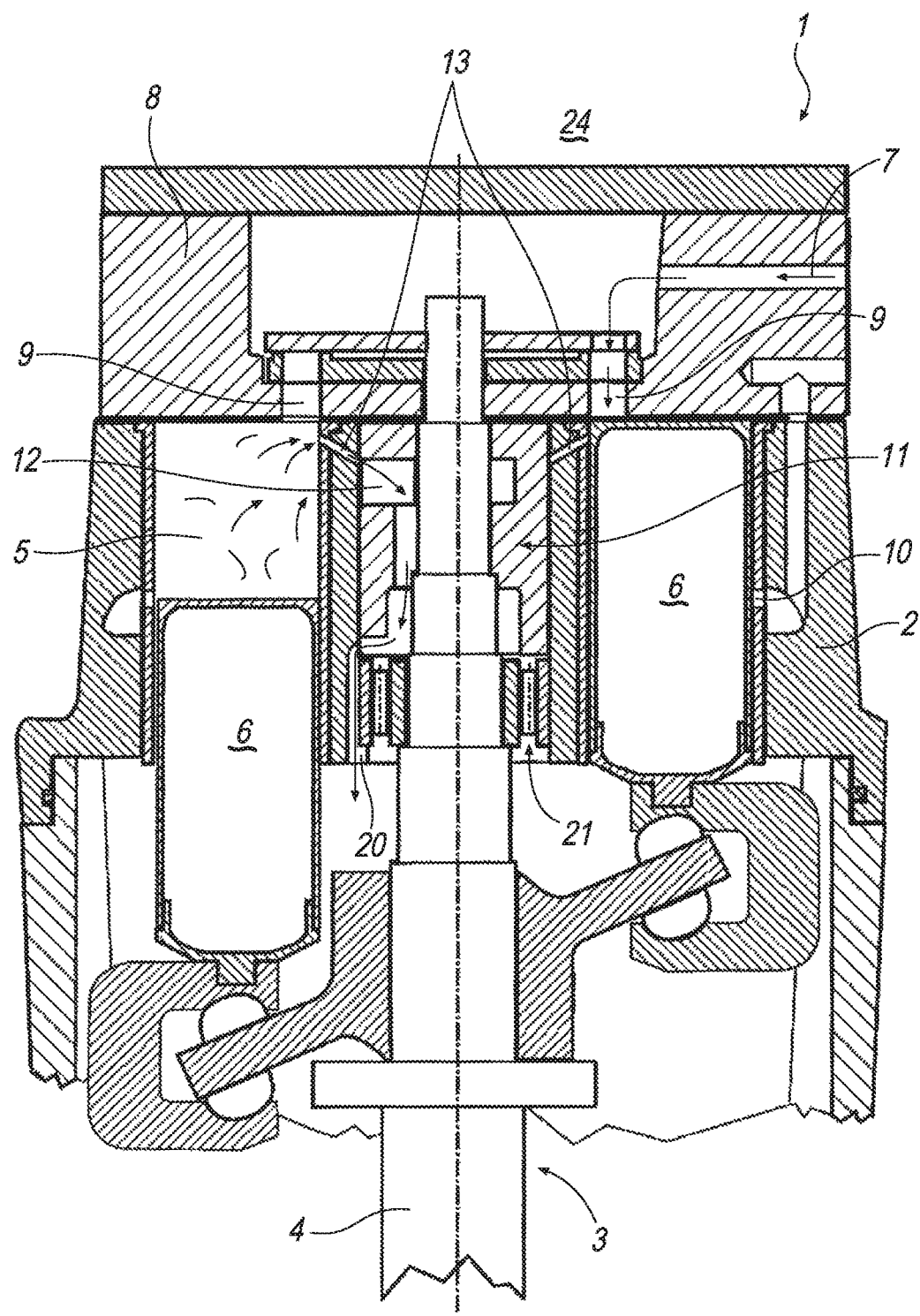
FIG. 1 illustrates a sectional representation through an axial piston machine according to the invention.

According to FIG. 1, an axial piston machine 1 according to the invention comprises a rotor 3 that is rotatably mounted in a housing 2 with a shaft 4. Annularly about and parallel to the rotor 3, cylinders 5 are arranged, in which pistons 6 are translationally adjustable by means of an expanding working medium 7. Each cylinder 5 is assigned an inlet opening 9 in a cylinder head 8 and outlet openings 10 in the housing 2, wherein via the inlet opening 9 the working medium 7 can flow into the cylinder 5 and via the outlet opening 10 again escape from the same. An auxiliary outlet rotary slide valve 11 with an auxiliary outlet opening 12

(drain opening), which is connected or can be connected (see also FIGS. 2 to 4) to one of the cylinders 5 for its venting via a vent duct 13 dependent on the angle of rotation, is fixed to the shaft in a rotationally fixed manner According to the invention, this auxiliary outlet rotary slide valve 11 now has a material which reduces the sliding friction resistance, which is formed at least partially from carbon or from a polymer. Since the auxiliary outlet rotary slide valve 11 co-rotates quasi force-free and does not have to transmit any major forces, the complete auxiliary outlet rotary slide valve 11 can thus be produced from a material with a high carbon content. Such a material is not only temperature-resistant and has self-lubricating properties but it is additionally also fine-wear capable and because of this can "grind itself in" into a uniform operating state. Such an auxiliary outlet rotary slide valve 11 can be cost-effectively produced with high dimensional stability for example by primary forming, i.e. pressing into a blank and subsequent annealing, and is additionally significantly lighter than an auxiliary outlet rotary slide valve made of steel known from the prior art. Such an auxiliary outlet rotary slide valve 11 is shown for example in the detail representation of the FIGS. 3 and 4. The auxiliary outlet rotary slide valve 11 can be locked on the shaft 4 in circumferential direction with a feather key 25 as illustrated in FIG. 5.

Alternatively to this it can also be provided that the auxiliary outlet rotary slide valve 11 has a pot-shaped basic body 14 deep-drawn from sheet metal (see FIG. 2), which has a carbon-containing coating 15 or a polymer-containing coating 16. Both these coatings 15, 16 likewise make possible a grinding-in and additionally reduce the sliding resistance, which is advantageous for the efficiency of the axial piston machine 1 according to the invention.

Figures 2, 3:
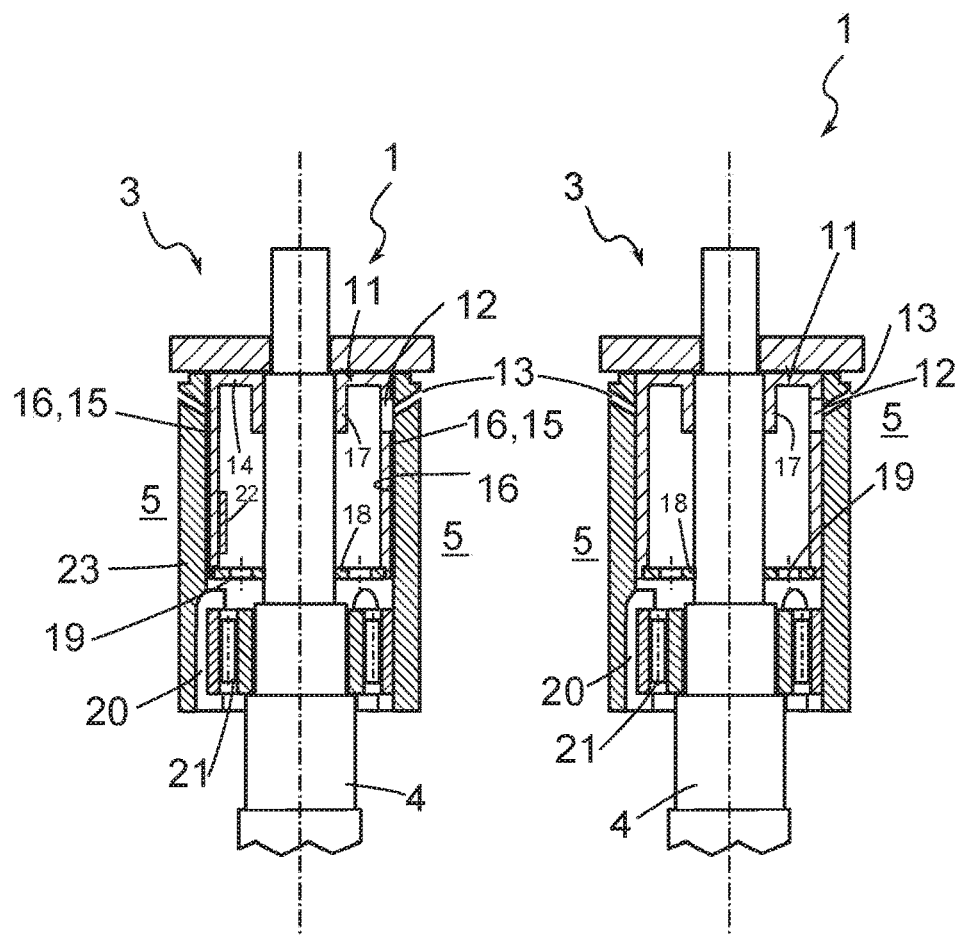
FIG. 2 illustrates a detail representation from FIG. 1 in the region of an auxiliary outlet rotary slide valve with a polymer or carbon-containing coating.
FIG. 3 illustrates a representation as in FIG. 2, however with an auxiliary outlet rotary slide valve of a material which is formed at least partly from carbon or from a polymer.

The basic body 14 according to FIGS. 2 and 3 has a formed collar 17, via which the basic body 14 is welded, soldered, pressed or glued to the shaft 4. Such a collar 17 can obviously be also provided with an auxiliary outlet rotary slide valve 11, which is completely formed from a carbon-containing or a polymer-containing material, as is shown according to FIG. 3.

In order to be able to mount the auxiliary outlet rotary slide valve 11 better and in a more stable manner, the pot-shaped basic body 14 or a pot-shaped auxiliary outlet rotary slide valve 11 configured in this manner can be closed off with a lid 18 (see the FIGS. 2 and 3), wherein this lid 18 can likewise be connected, for example welded, soldered, pressed or glued to the shaft 4. In the lid 18 itself, openings 19 are provided, via which the working medium 7 expelled from the respective cylinder 5 via the vent duct 13 and the auxiliary outlet opening 12 can be discharged. To this end, an undercut 20 for example is additionally provided on a bearing 21 that is adjacent to the lid 18. The flow cross section through the bearing 21 itself would be too small under certain conditions.

In order to be able to further reduce a sliding friction resistance during the operation of the axial piston machine 1, at least one housing wall 23 that is in contact with an auxiliary outlet rotary slide valve 11 can also be provided with a polymer-containing coating 16 reducing the sliding friction resistance.

Such a polymer-containing coating 16 can for example comprise a matrix of a plastic of polymeric polyimide/polyamide, which distributed over the entire matrix has the following composition: 10-25% by volume of aluminium powder, preferably 12.5% by volume of aluminium powder, 2-8% by volume of fluoropolymer, preferably up to 6-8% by volume of fluoropolymer, 2-10% by volume of silane, preferably 3-8% by volume of silane, particularly preferably up to 3-6% by volume of silane and the remaining parts of polyimide/amide resin without random contaminations. Through the addition of silanes, in particular the stability of the polyimide/amide matrix can be improved without the fillers that were required for this in the past. The silane material may be selected from a group consisting of gamma aminopropyl-triethoxysilane and bis-(gamma triemethoxy-silylpropyl) amine Through the polyimide/amide resin matrix, a high chemical resistance and a high mechanical and thermal load capacity can also be achieved. The addition of approximately 2-8% by volume of fluoropolymer, preferably up to 6-8% by volume of fluoropolymer, causes the desired reduction of the friction coefficient wherein as fluoropolymer for example polytetrafluoroethylene (PTFE) can be used. Obviously, further fluoropolymer such as for example fluorinated ethylene propylene (FEP) can also be employed. By means of these fluoropolymers, the sliding properties in particular can be significantly improved.

In an advantageous further development of the solution according to the invention, the aluminium powder has particles in the form of thin flakes with a size of approximately 1 to 40 µm, preferentially 1 to 5 µm. Through such a size distribution of the aluminium particles, the wear resistance can be significantly increased.

In a further advantageous further development of the solution according to the invention, the polymer-containing coating has color pigments, in particular 5-20% by volume of copper phthalocyanine, which colors the polymer coating blue. Thus, any abrasion in the case of wear can be quickly and safely detected.

In place of the polymer-containing coating 16, a carbon-containing coating 15 can obviously be applied onto the basic body 4 or generally onto the auxiliary outlet rotary slide valve 11 or the auxiliary outlet rotary slide valve 11 is entirely formed from such material 15 or 16.

Figure 4:
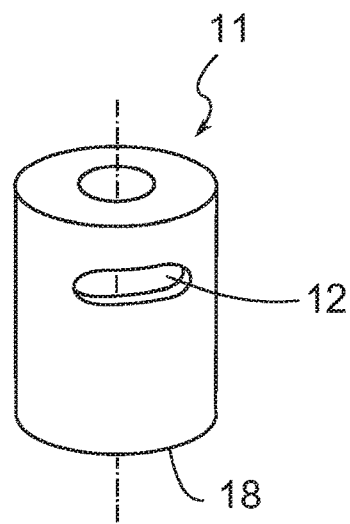
FIG. 4 illustrates a view of an auxiliary outlet rotary slide valve according to the invention.
Figure 5:
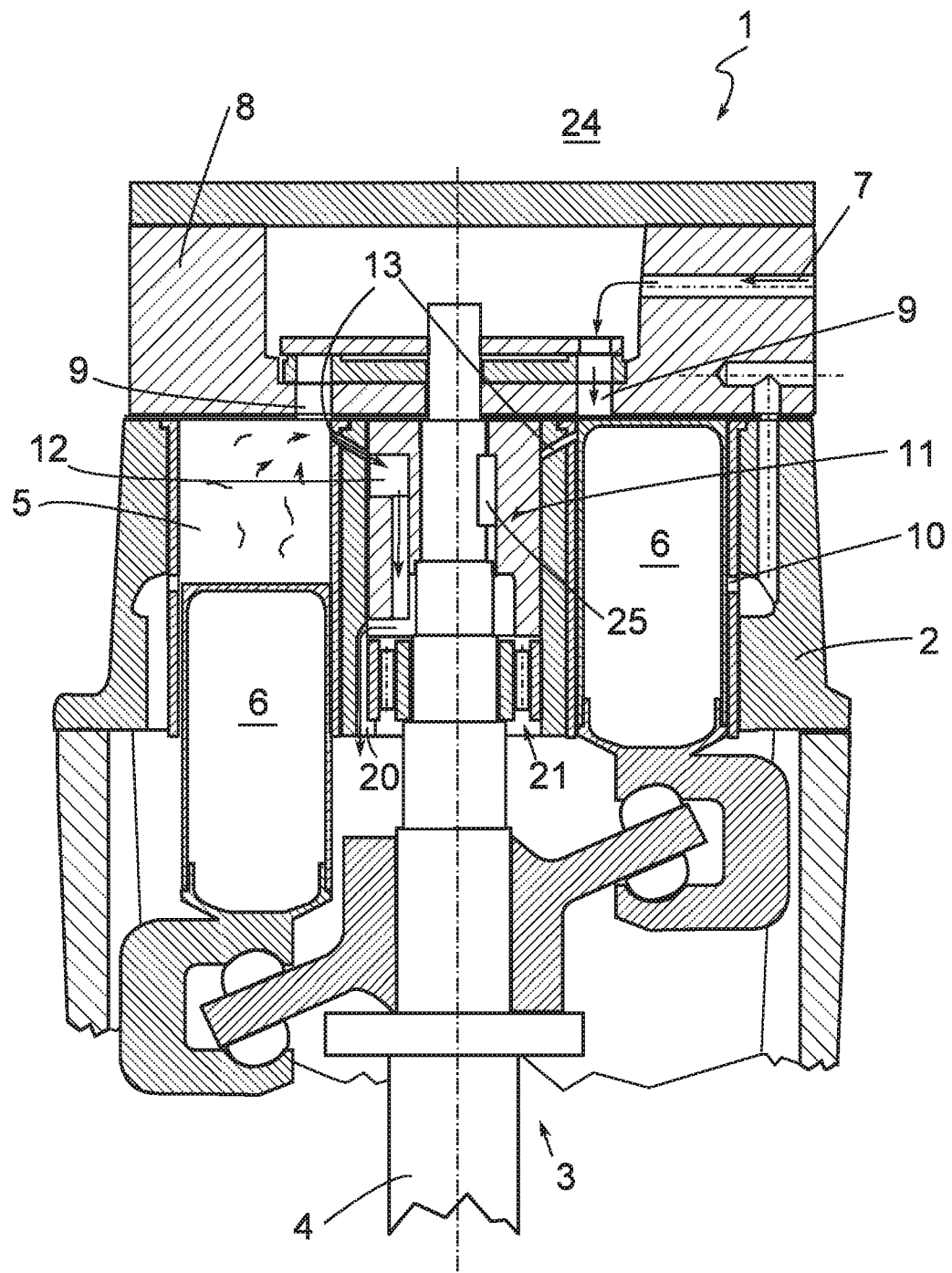
FIG. 5 illustrates a section representation through an exemplary axial piston machine according to the invention.

Looking again at FIG. 4, a view of the auxiliary outlet rotary slide valve 11 with the auxiliary outlet opening 12 is visible in the same, via which a venting of a respective cylinders 5 is controlled.

With the auxiliary outlet rotary slide valve 11 configured according to the invention it is not only possible to create a component that is significantly lighter compared with an auxiliary outlet rotary slide valve formed from steel and known from the prior art but greater manufacturing tolerances can also be offset, and auxiliary outlet rotary slide valves 11 according to the invention are able to "grind themselves in" into an operating state that stays the same because of its fine-wear capability.

In addition to this, a weight 22 can be arranged in the auxiliary outlet rotary slide valve 11 which is arranged unilaterally and through its centrifugal force upon rotation acts on the shaft 4 and the auxiliary outlet rotary slide valve 11 in such a manner that a pressure force acting through between wall 23 and auxiliary outlet rotary slide valve 11, which would like to bring about a deformation of the auxiliary outlet rotary slide valve 11 or of the shaft 4, at least partly compensate (see FIG. 2). The weight 22 in this case can be formed as additional weight and be attached to the auxiliary outlet rotary slide valve 11 or at least partly embedded in the material of the same. Obviously it is also conceivable that in place of the weight 22 a material agglomeration of the material of the auxiliary outlet rotary slide valve 11 is provided, which then brings about the desired centrifugal forces.

The axial piston machine 1 according to the invention can be part of a heat recovery system 24 in a motor vehicle which is not described in more detail, so that for example the working medium 7 is heated for example by means of hot exhaust gas of an internal combustion engine. Because of this it is possible to convert thermal energy into mechanical energy and because of this recover energy.

The invention claimed is:

1. An axial piston machine comprising:
a rotor having a shaft rotatably mounted in a housing;
a plurality of cylinders arranged annularly around the rotor;
a plurality of pistons each disposed within each of the plurality of cylinders, the plurality of pistons structured and arranged to selectively translate within each of the plurality of cylinders;
wherein each of the plurality of cylinders are in operative communication with i) an inlet opening defined in a cylinder head and ii) at least one outlet opening defined in the housing;
an auxiliary outlet rotary slide valve operatively connected to the shaft in a rotationally fixed manner, wherein the auxiliary outlet rotary slide valve includes an auxiliary outlet rotary opening structured and arranged to connect to a vent duct of one of the plurality of cylinders, based on an angle of rotation, to vent the one of the plurality of cylinders;
wherein the auxiliary outlet rotary slide valve includes a metal pot-shaped body having a base portion, the shaft extending through the base portion of the pot-shaped body; and
wherein at least a portion of the auxiliary outlet rotary slide valve comprises a material configured to reduce a sliding friction resistance, and wherein the material includes carbon or a polymer.

2. The axial piston machine according to claim 1, wherein the pot-shaped body includes at least one of a carbon-containing coating and a polymer-containing coating.

3. The axial piston machine according to claim 1, wherein the pot-shaped body includes a collar projecting from the base portion of the pot-shaped body into a space defined at least partially within the pot-shaped body, and wherein the collar is connected to the shaft in the rotationally fixed manner.

4. The axial piston machine according to claim 3, further comprising a lid closing off the pot-shaped body, wherein the lid is disposed axially opposite the collar and is connected to the shaft in a rotationally fixed manner such that the shaft extends axially through the auxiliary outlet rotary slide valve via the lid and the base portion.

5. The axial piston machine according to claim 1, wherein:
the material of the auxiliary outlet rotary slide valve is composed at least partially of said carbon;
the auxiliary outlet rotary slide valve is composed completely of the material; and
the auxiliary outlet rotary slide valve further includes a polymer-containing coating.

6. The axial piston machine according to claim 5, wherein the auxiliary outlet rotary slide valve is secured to the shaft in a circumferential direction via a feather key.

7. The axial piston machine according to claim 1, wherein the housing includes at least one housing wall in contact with the auxiliary outlet rotary slide valve, and wherein the at least one housing wall includes a polymer-containing coating configured to reduce the sliding friction resistance.

8. The axial piston machine according to claim 2, wherein the pot-shaped body includes the polymer-containing coating, and wherein the polymer-containing coating has a matrix of a plastic of polymeric polyimide/amide material, the matrix having a composition of:
5-25% by volume of an aluminium powder;
2-8% by volume of a fluoropolymer;
2-10% by volume of a silane; and
a remainder that is without contaminations.

9. The axial piston machine according to claim 8, wherein the polymer-containing coating includes a color pigment.

10. The axial piston machine according to claim 8, wherein the aluminium powder includes a plurality of thin flakes having a size of 1 to 40 µm.

11. The axial piston machine according to claim 8, wherein the fluoropolymer is selected from a group consisting of: polytetrafluoroethylene (PTFE) and fluorinated ethylene propylene (FEP).

12. The axial piston machine according to claim 8, wherein the silane material is selected from a group consisting of: gamma aminopropyl-triethoxysilane and bis-(gamma triemethoxy-silylpropyl) amine.

13. The axial piston machine according to claim 2, wherein the pot-shaped body includes the polymer-containing coating, and wherein the polymer-containing coating is applied via a spray.

14. The axial piston machine according to claim 1, further comprising a weight arranged within the auxiliary outlet rotary slide valve such that the weight provides a centrifugal force counteracting a pressure force in one of the plurality of cylinders during a working cycle.

15. The axial piston machine according to claim 14, wherein the weight is structured i) as a separate component from the auxiliary outlet rotary slide valve or ii) as an integral portion of the auxiliary outlet rotary slide valve.

16. A heat recovery system in a motor vehicle comprising the axial piston machine of claim 1.

17. The axial piston machine according to claim 1, wherein the material of the auxiliary outlet rotary slide valve includes the carbon.

18. The axial piston machine according to claim 1, wherein the material of the auxiliary outlet rotary slide valve includes the polymer.

19. The axial piston machine according to claim 8, wherein 5-20% by volume of the polymer-containing coating is a color pigment, and wherein the color pigment is copper phthalocyanine.

20. An axial piston machine comprising:
a rotor having a shaft rotatably mounted in a housing;
a plurality of cylinders arranged annularly around the rotor;
a plurality of pistons each disposed within each of the plurality of cylinders, the plurality of pistons structured and arranged to selectively translate within each of the plurality of cylinders;
wherein each of the plurality of cylinders are in operative communication with i) an inlet opening defined in a cylinder head and ii) at least one outlet opening defined in the housing;
an auxiliary outlet rotary slide valve operatively connected to the shaft in a rotationally fixed manner, wherein the auxiliary outlet rotary slide valve includes an auxiliary outlet rotary opening structured and arranged to connect to a vent duct of one of the plurality of cylinders, based on an angle of rotation, to vent the one of the plurality of cylinders;
wherein at least a portion of the auxiliary outlet rotary slide valve comprises a material configured to reduce a sliding friction resistance, the material comprising a carbon containing material or a polymer containing material;
wherein the auxiliary outlet rotary slide valve includes a metal pot-shaped body having a polymer coating;
wherein the polymer coating has a matrix of a plastic of polymeric polyimide/amide material, the matrix having a composition of:
5-25% by volume of an aluminium powder;
2-8% by volume of a fluoropolymer;
2-10% by volume of a silane; and
a remainder that is without contaminations.

* * * * *